W. E. COPITHORN.
WHEEL RIM.
APPLICATION FILED JAN. 14, 1915.
1,190,118.
Patented July 4, 1916
2 SHEETS—SHEET 1.
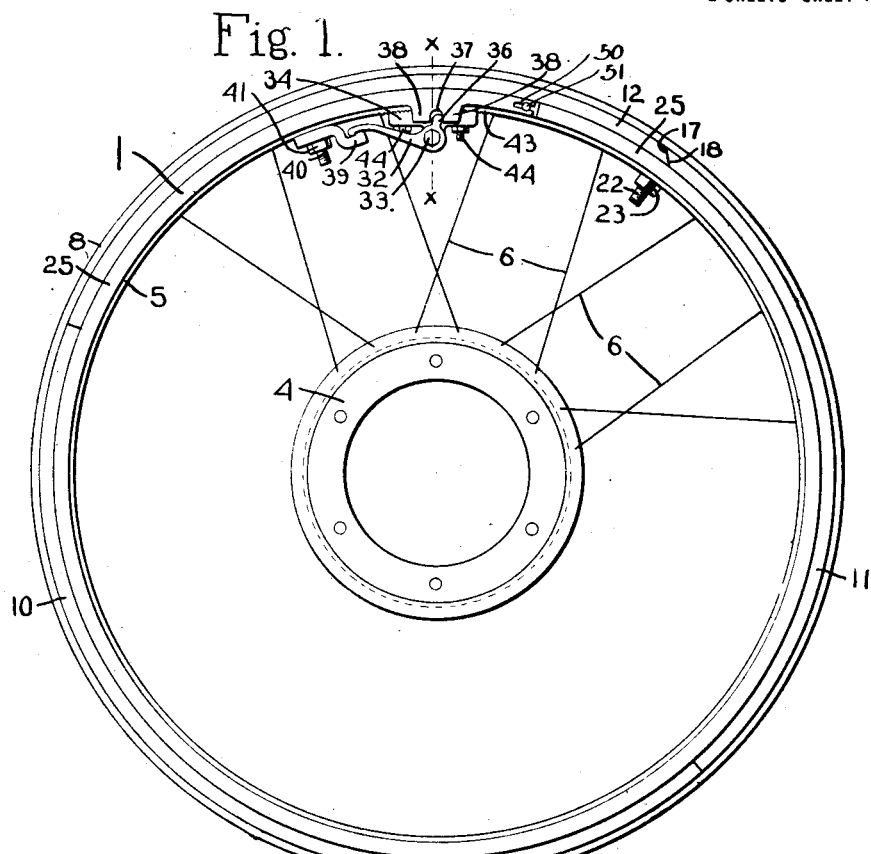
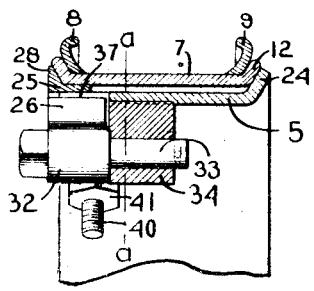
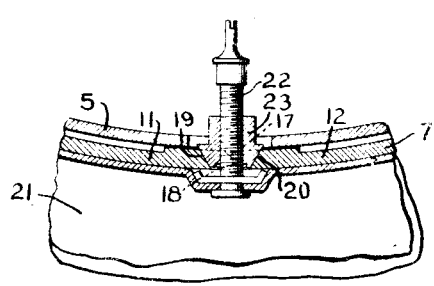
Witnesses.
J. Morrill Fuller
William E. Gagen
Inventor.
Walter E. Copithorn
by Heard Smith & Tennant.
Att'ys W. E. COPITHORN.
WHEEL RIM.
APPLICATION FILED JAN. 14, 1915.
1,190,118.
Patented July 4, 1916
2 SHEETS—SHEET 2.
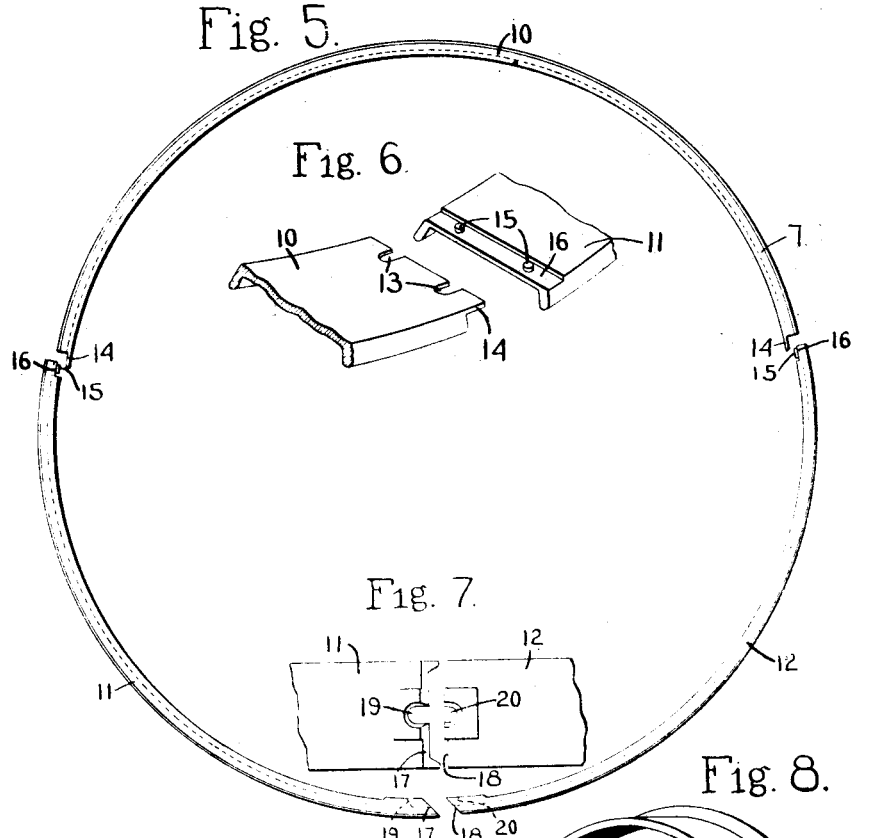
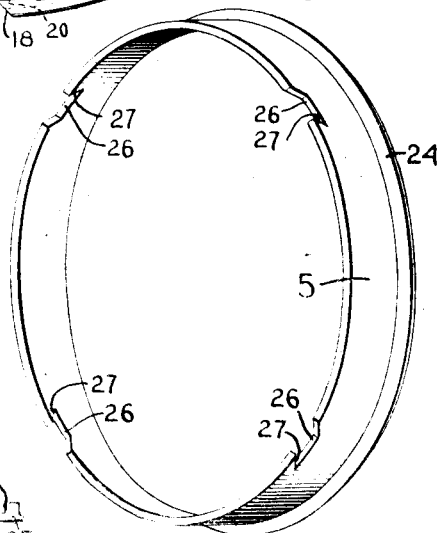
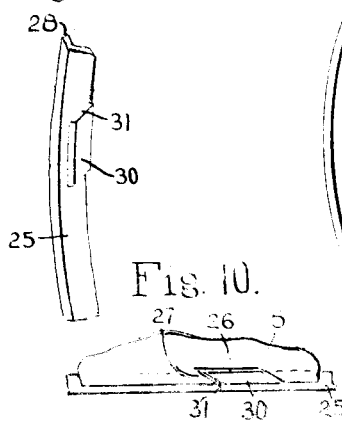
Witnesses.
Inventor.
Walter E. Copithorn
by Heard Smith & Tennant.
Att'ys

UNITED STATES PATENT OFFICE.

WALTER E. COPITHORN, OF NATICK, MASSACHUSETTS.

WHEEL-RIM.

1,190,118.  Specification of Letters Patent.  Patented July 4, 1916.

Application filed January 14, 1915. Serial No. 2,253.

*To all whom it may concern:*

Be it known that I, WALTER E. COPITHORN, a citizen of the United States, residing at Natick, county of Middlesex, State of Massachusetts, have invented an Improvement in Wheel-Rims, of which the following description, in connection with the accompanying drawing, is a specification, like characters on the drawing representing like parts.

This invention relates to automobile wheels and particularly to the rim portion thereof, and the object of the invention is to provide an improved demountable rim which can be quickly placed into position and locked therein and as quickly removed from the wheel.

In order to give an understanding of my invention I have illustrated in the drawings a selected embodiment thereof which will now be described, after which the novel features will be pointed out in the appended claims.

In the drawings, Figure 1 is a side view of a wheel embodying my invention; Fig. 2 is an enlarged section on the line *x*—*x*, Fig. 1; Fig. 3 is a sectional view through the rim showing the manner of expanding the demountable rim; Fig. 4 is a section on the line *a*—*a*, Fig. 2; Fig. 5 is a view showing the demountable rim; Figs. 6 and 7 are fragmentary perspective views showing details of said demountable rim; Fig. 8 is a perspective view of the rim portion of the wheel body on which the demountable rim is sustained; Fig. 9 is a fragmentary view of a portion of the locking ring; Fig. 10 is a fragmentary view showing the manner in which the locking ring is interlocked with the rim of the wheel body.

I have shown at 1 a wheel body comprising a hub portion 4 and a rim portion 5 connected by spokes 6. These parts with the exception of the rim 5 may be of any suitable or usual construction as they form no part of my present invention. The particular form of wheel body herein shown, however, is similar to that illustrated and described in my co-pending application Se. No. 1512, filed January 11, 1915.

Situated exterior to the wheel body rim 5 is a demountable rim 7 on which the tire 21 is sustained, said tire being held in place by the two rings 8 and 9 that are adapted to secure either a tire of the clencher variety or a straight-edge tire. The demountable rim 7 is a sectional rim, it being herein constructed with the three sections 10, 11 and 12. The section 10 is detachably connected to each of the sections 11 and 12 by the means shown in Fig. 6, that is, each end of the section 10 is provided with a lip 14 having two slots 13 therein and the adjacent ends of the sections 11 and 12 are provided with the pins 15 to enter the slots 13, the underside of each section 11 and 12 being rabbeted, as shown at 16, to receive the lip 14. The meeting ends of the sections 11 and 12 are inclined, as shown at 17 and 18, said inclined ends overlying each other when the rim is in place. These meeting ends are provided with the notches 19 and 20 having tapered walls, which notches constitute a slot when the two ends 17 and 18 are in engagement with each other. This slot formed by the two alined notches 19 and 20 receives the valve stem 22 of the tire 21. A cone-shaped nut 23 is screw-threaded to the valve stem, the coned portion of the nut engaging the tapered walls of the notches 19 and 20, and serving to expand the demountable rim, thus tightening it firmly against the tire-retaining rings 8 and 9.

The demountable rim 7 above described is not claimed herein but is illustrated and described in my co-pending application Se. No. 78,126, filed February 14, 1916.

The rim portion 5 of the wheel body is provided at one edge with a positioning flange 24 against which one edge of the demountable rim 7 rests, and said demountable rim is held in place by a locking ring 25. The rim member 5 of the wheel body is provided in one edge with a plurality of notches 26, each having an undercut or inclined wall or shoulder 27. The locking ring 25 is shaped to overlie the rim 5 and enter between the latter and the demountable rim 7, said locking ring having a flanged portion 28 thereon which engages the side of the demountable rim and holds it in position. This locking ring 25 is also provided with locking projections 30 which have inclined walls 31 adapted to engage the inclined shoulders 27. The locking ring 25 is applied laterally to the wheel with the projections 30 entering the notches 26 and when said locking ring is in place it is given a turning movement to carry the shoulders of the projections 30 behind the shoulders 27 of the notches 26, thus holding the locking ring in place. To remove the demountable rim the locking ring is given a movement in the reverse direction. This movement is given to the locking ring by an actuating member 32 in the form of a lever mounted on a stud 33 that is sustained in a bearing member 34 secured to the rim member 5. This actuating lever 32 has a nose 36 which is received in a notch 37 in the locking ring, this notch being herein shown as formed by the space between two projections 38. The locking ring 25 can thus be given its locking and unlocking movement by simply turning the actuating lever 32 in one direction or the other. The locking ring 25 is an expansible and contractible ring and when in position it encircles the edge of the rim 5, as seen in Fig. 2. The locking movement of the locking ring operates to contract it against the outer face of the rim 5, as well as to move it into its locking position, and the unlocking movement of the ring operates to expand it so that it can be readily removed. The capability of expanding and contracting is provided for by making the ring a split ring. One end of the ring is shown as provided with a slot 50 in which operates a stud 51 extending from the other end of the ring, the stud and slot permitting an expanding or contracting movement to the locking ring. When the locking ring is put into position and is turned into locking position by the lever 32, the projections 30 will not only be drawn into the notches 26, but the locking ring will be contracted and drawn tightly about the rim 5.

Fig. 1 shows the parts in the position they occupy when the locking ring is locked in position, and to hold it in this position, I have provided a lever locking member 39 which is mounted on a stud 40 secured to the rim 5 and is held in place thereon by a locking nut 41. This locking member 39 engages the end of the lever 32 and thus holds it from turning movement. To unlock the lever 32 the nut 41 is loosened to permit the locking member 39 to be swung laterally out of engagement with the lever 32 after which the lever 32 can be turned to unlock the locking ring 25. The bearing block 34 is shown as adjustably secured to the rim 5, the purpose of this being to provide for adjustment as wear occurs. This bearing block is shown as having a serrated surface to engage a corresponding serrated surface 43 formed on the inner surface of the rim 5, and the block is held in position by means of bolts 44 which extend through slots therein. This provides for sufficient adjustment of the bearing block to take up wear, and when the bolts 44 are clamped tight the coöperating serrated surfaces of the rim and the block firmly hold the block in its adjusted position.

I claim:

1. The combination with a wheel body having a rim member provided on one of its edges with inclined shoulders, of a demountable rim encircling said rim member, a split locking ring for holding the demountable rim in place, said locking ring encircling the shouldered edge of the rim member and being provided with projections which are brought into engagement with and are disengaged from said shoulders by circumferential movement of the locking ring, and a lever pivoted to the rim member and engaging one end of the locking ring for moving it into locking position and contracting it tightly about the rim member.

2. The combination with a wheel body having a rim member provided with inclined shoulders, of a demountable rim encircling said body, a locking ring for holding the demountable rim in place and provided with projections which are brought into engagement with and disengaged from said shoulders by circumferential movement of the locking ring, a fulcrum block adjustably secured to said rim portion, and a lever pivoted to the fulcrum block and by which the locking ring is given its movement.

3. The combination with a wheel body having a rim member provided with inclined shoulders, of a demountable rim encircling said body, a split locking ring for holding the demountable rim in place, said locking ring encircling the rim member and provided with projections which are brought into engagement with and are disengaged from said shoulders by a circumferential movement of the locking ring, a fulcrum block adjustably secured to said rim member, and a lever pivoted to the fulcrum block and engaging one end of the locking ring, said lever operating to move the locking ring into locking position and to draw it tightly about the rim member.

4. The combination with a wheel body having a rim member provided with inclined shoulders, of a demountable rim encircling said body, a locking ring to hold the demountable rim in place and provided with projections which are brought into engagement with and disengaged from said shoulders by circumferential movement of the locking ring, said locking ring having a notch therein, a fulcrum block adjustably secured to the rim member, and an actuating lever pivoted to said fulcrum block and having a portion received in said notch whereby turning movement of said actuating lever will give movement to the locking ring.

5. The combination with a wheel body having a rim member provided on one of its edges with inclined shoulders, of a demountable rim encircling said rim member, a split locking ring for holding the demountable rim in place, said locking ring encircling the shouldered edge of the rim member and being provided with projections which are brought into engagement with and are disengaged from said shoulders by circumferential movement of the locking ring, said locking ring also having a notch adjacent one end thereof, an L-shaped lever pivoted to the rim member and having its shorter arm engaging said notch whereby swinging movement of the lever draws the locking ring tightly about the rim member and brings the projections thereon into locking engagement with said shoulders, and a locking member secured to the rim member and adapted to engage the other arm of said lever thereby to lock it in a position to hold the locking ring in its operative position.

In testimony whereof, I have signed my name to this specification, in the presence of two subscribing witnesses.

Dr. WALTER E. COPITHORN.

Witnesses:
Louis C. Smith,
Thomas J. Drummond.